United States Patent [19]
Kuo et al.

[11] Patent Number: 5,898,333
[45] Date of Patent: Apr. 27, 1999

[54] 1.5 BOOTSTRAPPED PASS-TRANSISTOR-BASED MANCHESTER-CARRY-CHAIN CIRCUIT SUITABLE FOR LOW-VOLTAGE CMOS VLSI

[75] Inventors: James B. Kuo; Jea-Hong Lou, both of Taipei, Taiwan

[73] Assignee: National Science Council, Taiwan

[21] Appl. No.: 08/953,542

[22] Filed: Oct. 20, 1997

[51] Int. Cl.$^6$ ............................................. H03K 17/16
[52] U.S. Cl. .......................... 327/390; 327/589; 326/88
[58] Field of Search ............................... 327/536, 543, 327/383, 390, 589; 326/88, 92

[56] References Cited

U.S. PATENT DOCUMENTS

| | | | |
|---|---|---|---|
| 5,514,994 | 5/1996 | Sawada | 327/390 |
| 5,729,165 | 3/1998 | Lou et al. | 327/589 |
| 5,783,962 | 7/1998 | Rieger | 327/383 |

FOREIGN PATENT DOCUMENTS

| | | | |
|---|---|---|---|
| 358069114 | 4/1983 | Japan | 327/390 |

OTHER PUBLICATIONS

Lou, J.H. et al., "A 1.5V Full–Swing Bootstrapped CMOS Large Capacitive–Load Driver Circuit Suitable for Low-Voltage CMOS VLSI", IEEE Journal of Solid–State Circuits, 32:119–121, 1997.

*Primary Examiner*—Timothy P. Callahan
*Assistant Examiner*—Jung Ho Kim
*Attorney, Agent, or Firm*—Fish & Richardson P.C.

[57] ABSTRACT

This invention discloses a 1.5 V bootstrapped pass-transistor-based Manchester-carry-chain circuit suitable for CMOS VLSI using a low supply voltage, in which a bootstrapper circuit is incorporated to enhance the speed performance of the conventional Manchester-carry-chain circuit, which is composed. The bootstrapper circuit contains two P-type metal-oxide-semiconductor (PMOS) transistors, one N-type metal-oxide-semiconductor (NMOS) transistor; a capacitor device, and an inverter. The bootstrapper circuit provides an output having a voltage overshoot, as a carry propagation signal, to the gate of a pass transistor of the Manchester-carry-chain circuit.

2 Claims, 5 Drawing Sheets

1.5 BOOTSTRAPPED PASS-TRANSISTOR-BASED MANCHESTER-CARRY-CHAIN CIRCUIT SUITABLE FOR LOW-VOLTAGE CMOS VLSI

BACKGROUND

CMOS Manchester-carry-chain circuit as shown in FIG. 1 based on pass transistors and dynamic logic techniques have been used to implement arithmetic circuit [N. H. E. Weste and K. Eshraghian, "Principles of CMOS VLSI Design," Addison Wesley: New York, N.Y., 1985; J. Kernhof, M. A. Beunder, B. Hoefflinger, and W. Haas, "High-Speed CMOS Adder and Multiplier Modules for Digital Signal Processing in a Semicustom Environment," IEEE J. Solid-State Circuits, pp. 570–575, June 1989; J. B. Kuo H. J. Liao and H. P. Chen, "A BiCMOS Dynamic Carry-Look-Ahead Adder Circuit for VLSI Implementation of High Speed Arithmetic Unit," IEEE J. Solid-State Circuits, March 1993; and J. B. Kuo, S. S. Chen, C. S. Chang, K. W. Su, and J. H. Lou, "A 1.5 V BiCMOS Dynamic Logic Circuit Using a "BiPMOS Pull-Down" Structure for VLSI Implementation of Full Adders," IEEE Trans. Circuits and Systems-I, Vol. 41, No. 4, pp. 329–332, April 1994]. The Manchester-carry-chain circuit is used to process the propagate ($P_i$) and generate ($G_i$) signals produced by the half adders to generate the carry signals ($\overline{C_i}$), wherein a clock signal (CK) is required for the processing. With the pass transistor configuration, Manchester-carry-chain circuit has the smallest transistor count among all carry-chain circuits including domino and other static techniques introduced in the above-mentioned prior art references. The function of the Manchester-carry-chain circuit is:

$$C_i = G_i + C_{i-1} \cdot P_i,$$

wherein i=1~n, where n is the bit number; $C_i$ is an inverted carry signal; $G_i$ and $P_i$ are the generate and propagate signals ($G_i = X_i \cdot Y_i$, $P_i = X_i \oplus Y_i$) produced from two inputs ($X_i$, $Y_i$) to the half adder. In the Manchester-carry-chain circuit, each bit carry signal ($\overline{C_i}$) is low if the generate signal ($G_i$) is high or if the propagate signal ($P_i$) is high and the carry signal of the previous bit ($\overline{C_{i-1}}$) is low. Pass transistors have been used to control the operation of the Manchester-carry-chain circuit. However, when the Manchester-carry-chain chain is long, as in a 64-bit adder, the ripple-carry propagation delay becomes unacceptable due to the RC delay of the pass transistor. In other words, the density advantage of the Manchester-carry-chain circuit is offset by the drawback in the speed. This is especially serious when the supply voltage is scaled down, which is a trend for deep-submicron VLSI.

SUMMARY

A high-speed 1.5 V bootstrapped pass-transistor-based Manchester-carry-chain circuit suitable for low-voltage CMOS VLSI is described in this invention, which comprises in a conventional Manchester-carry-chain circuit a bootstrapper circuit consisting essentially of two P-type metal-oxide-semiconductor (PMOS) transistors MPB and MP, each of which having a drain terminal, a source terminal and a gate terminal; one N-type metal-oxide-semiconductor (NMOS) transistor MN having a drain terminal, a source terminal and a gate terminal; a capacitor device having a top plate and a bottom plate; and an inverter having an input terminal and output terminal. Said source terminal of said NMOS transistor MN is earthed, and said input terminal of said inverter is provided with an input signal $\overline{P_i}$. Said drain terminal of said PMOS transistor MP and said source terminal of said PMOS transistor MPB are both connected to said bottom plate of said capacitor device. The source terminal of said PMOS transistor MP is connected to a power $V_{dd}$, and said drain terminal of said PMOS transistor MPB is connected to said drain terminal of said NMOS transistor MN. The gate terminals of said NMOS transistor MN and PMOS transistor MPB are provided with said input signal $\overline{P_i}$. The gate terminal of said PMOS transistor MP and said top plate of said capacitor device are both connected to said output terminal of said inverter. An intermediate node between said drains of said PMOS transistor MPB and said NMOS transistor MN is connected to a gate terminal of a NMOS transistor as a pass transistor in said conventional Manchester-carry-chain circuit so that a carry propagation signal $P_i$ is provided from said intermediate node to said gate terminal of said pass transistor.

Preferably, said capacitor device is a PMOS transistor MPC having a drain terminal, a source terminal and a gate terminal, of which the drain terminal and source terminal are connected with each other. The connected drain terminal and source terminal of PMOS transistor MPC are connected to said drain terminal of said PMOS transistor MP and to said source terminal of said PMOS transistor MPB as said bottom plate, and said gate terminal of PMOS transistor MPC is connected to said output terminal of said inverter as said top plate of said capacitor device.

With the bootstrapped technique, the speed performance of a 4-bit Manchester-carry-chain circuit can be enhanced by 70% at a supply voltage of 1.5 V as compared to the conventional Manchester-carry-chain circuit.

DETAILED DESCRIPTION OF A PREFERRED EMBODIMENT

Figure 1:
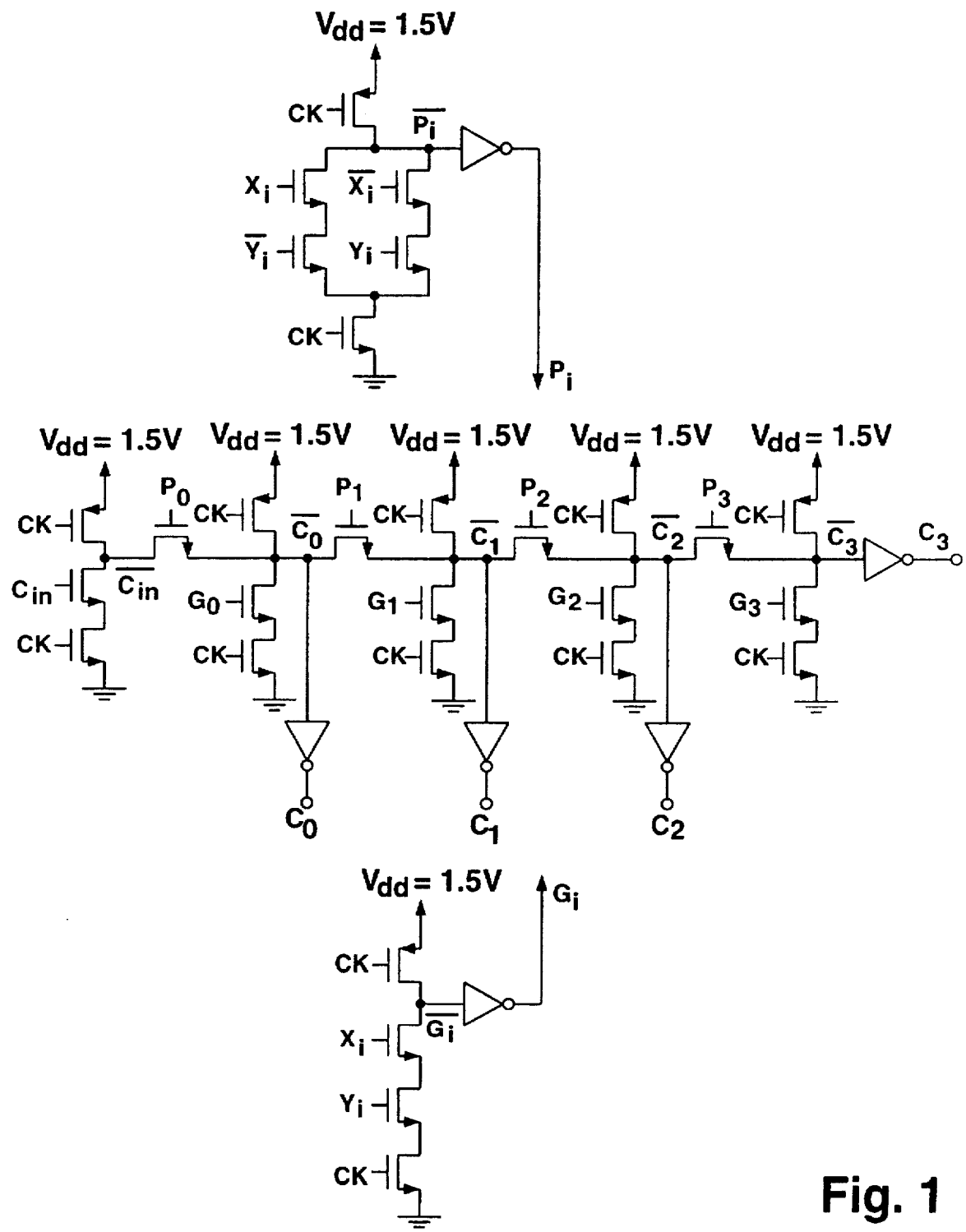
FIG. 1 shows a circuit diagram of a conventional 4-bit Manchester-carry-chain circuit.
Figure 2A:
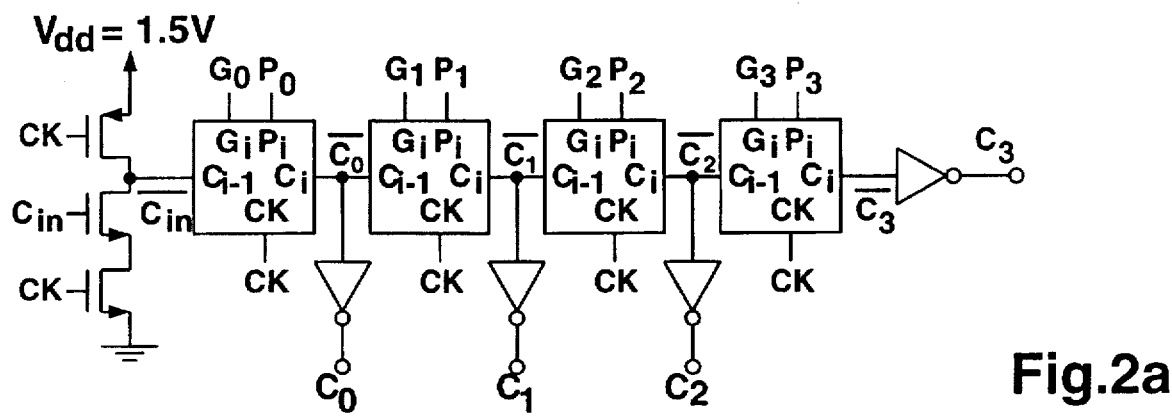
FIG. 2a shows a circuit block diagram of a 4-bit Manchester-carry-chain circuit using a 1.5 V bootstrap pass-transistor-based circuit in each Manchester-carry-chain cell thereof.
Figure 2B:
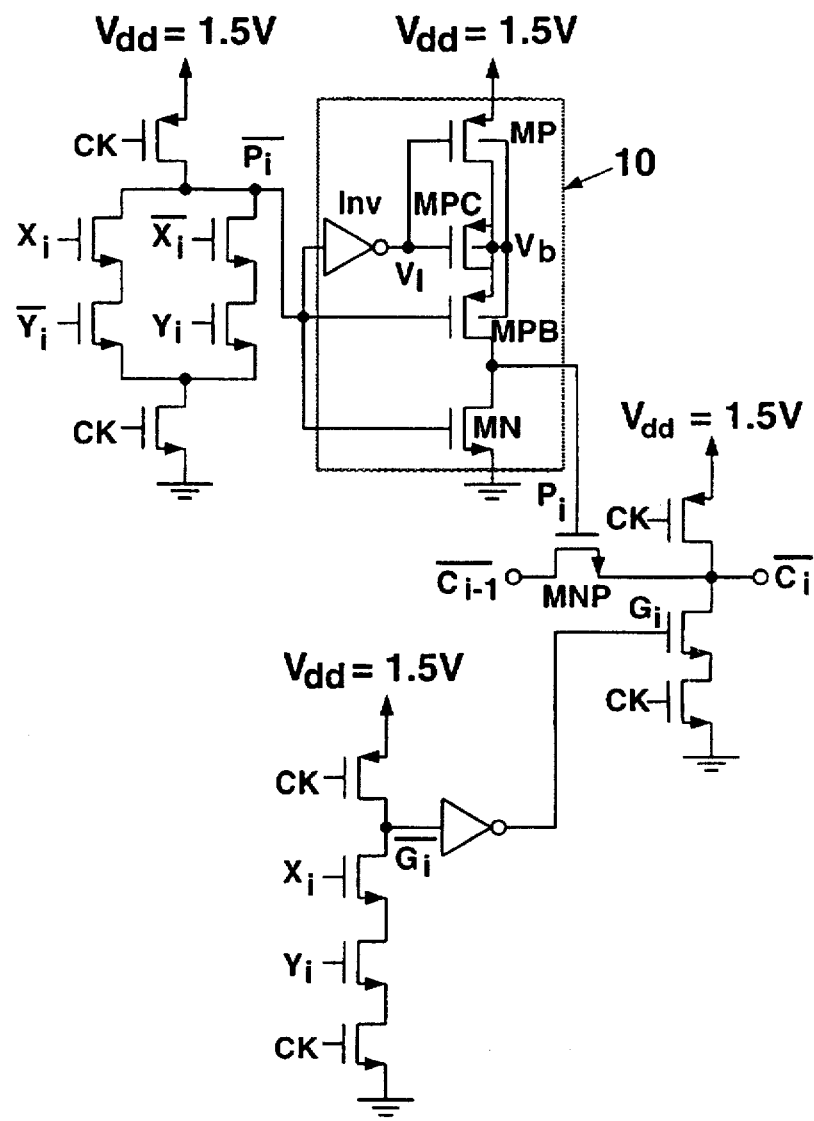
FIG. 2b shows a detailed circuit diagram of the Manchester-carry-chain cell in FIG. 2a using a 1.5 V bootstrap pass-transistor-based circuit.

FIGS. 2a and 2b show a 1.5 V bootstrapped pass-transistor-based Manchester-carry-chain circuit according to a preferred embodiment of the present invention. As shown in FIG. 2b, the bootstrapper circuit ["A 1.5 V Full-Swing Bootstrapped CMOS Large Capacitive-Load Driver Circuit Suitable for Low-Voltage Deep-Submicron CMOS VLSI," U.S. patent application Ser. No. 08/627,482, filed Apr. 4, 1996, Notice of Allowance received], which functions as an inverter, is used to boost the input signal to the gate of the pass transistors. As shown in FIG. 2b, when the input $\overline{P}_i$ to a bootstrapper circuit 10 switches from high to low, the output of $P_i$ will change from low to surpass $V_{dd}$. When the input $\overline{P}_i$ to the bootstrapper circuit 10 is high, the PMOS transistor MPB is off and the NMOS transistor MN is on. Therefore, the output of the bootstrapper circuit 10 is pulled low to ground. At the same time, $V_f$ is low, hence the PMOS transistor MP is on and $V_b$ is pull high to $V_{dd}$. At this time, the bootstrap transistor MPC, which is made of a PMOS device with its source and drain terminal tied together, stores an amount of $(V_{dd}-|V_{TP}|)C_{ox}WL$ charge, where $C_{ox}$ is unit area gate oxide capacitance $(C_{ox}=\epsilon_{ox}/t_{ox})$, and $V_{TP}$ is the threshold voltage of the PMOS device. When the input switches from high to low, the MN turns off and MPB turns on. Meanwhile, $V_f$ changes to high and MP turns off. Since the bootstrap transistor MPC turns off, the evacuated holes from the channel of the PMOS device will make $V_b$ go up to exceed $V_{dd}$—the internal voltage overshoot. Consequently, the output $P_i$ of the bootstrapper circuit 10 will also go up to surpass $V_{dd}$. The voltage overshoot at the output $P_i$ of the bootstrapper circuit 10, which is supplied to a gate terminal of a NMOS transistor MNP (pass transistor) of a Manchester-carry-chain circuit, enhances the speed performance of the pass-transistor-based Manchester-carry-chain circuit owing to the extra gate overdrive voltage. The advantages of the bootstrapper circuit 10 are especially noticeable for the low supply voltage applications.

Figure 3A:
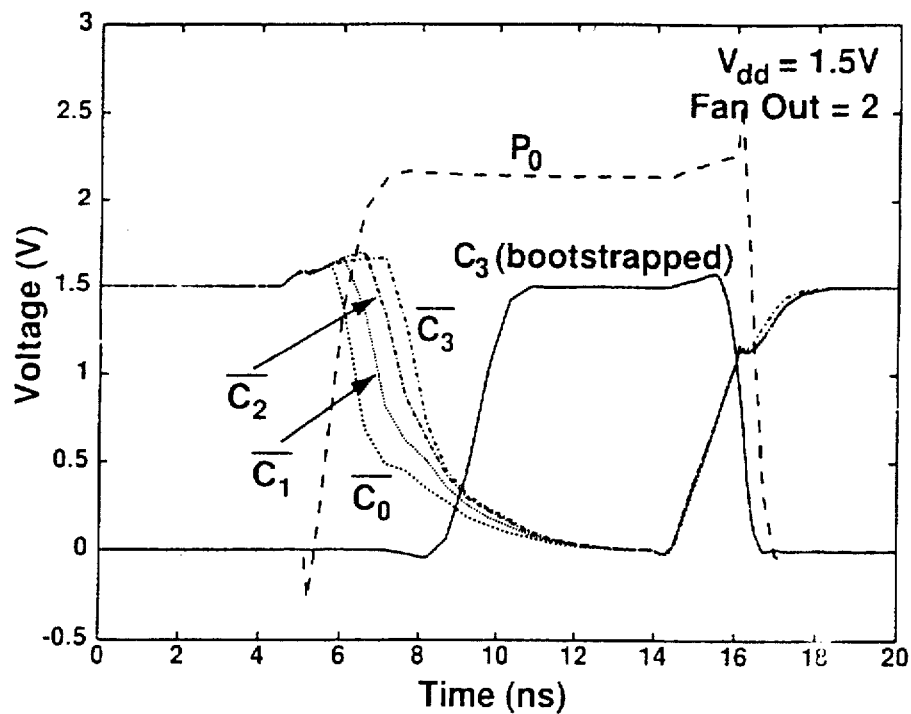
FIG. 3a is a Voltage (V) versus time (ns) plot showing transients of the 4-bit Manchester-carry-chain circuit using the 1.5 V bootstrapped pass-transistor-based circuit.
Figure 3B:
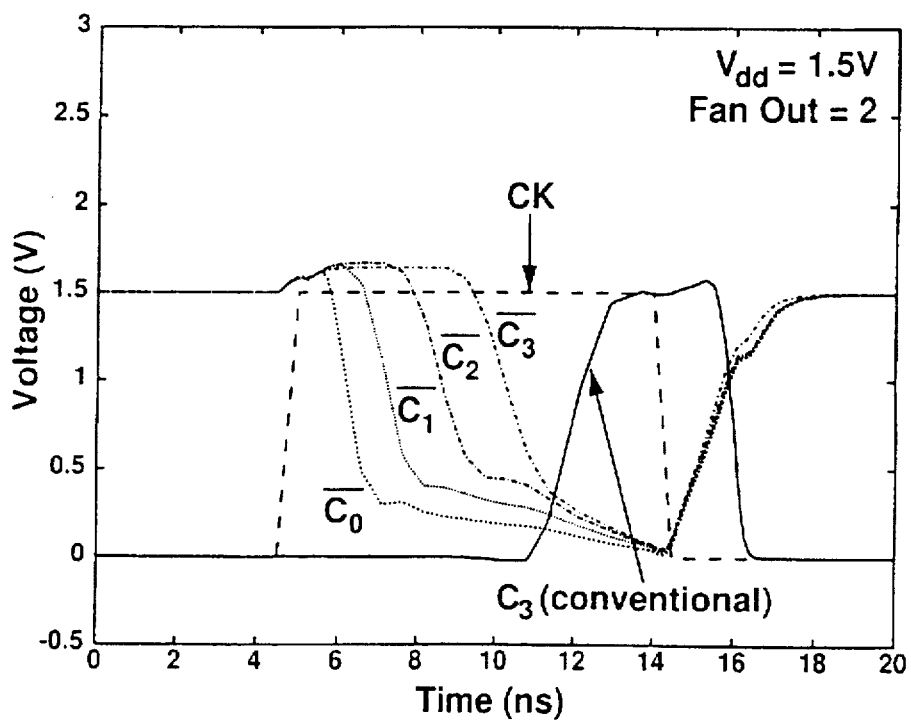
FIG. 3b is a Voltage (V) versus time (ns) plot showing transients of the 4-bit Manchester-carry-chain circuit without the 1.5 V bootstrapped pass-transistor-based circuit.
Figure 4:
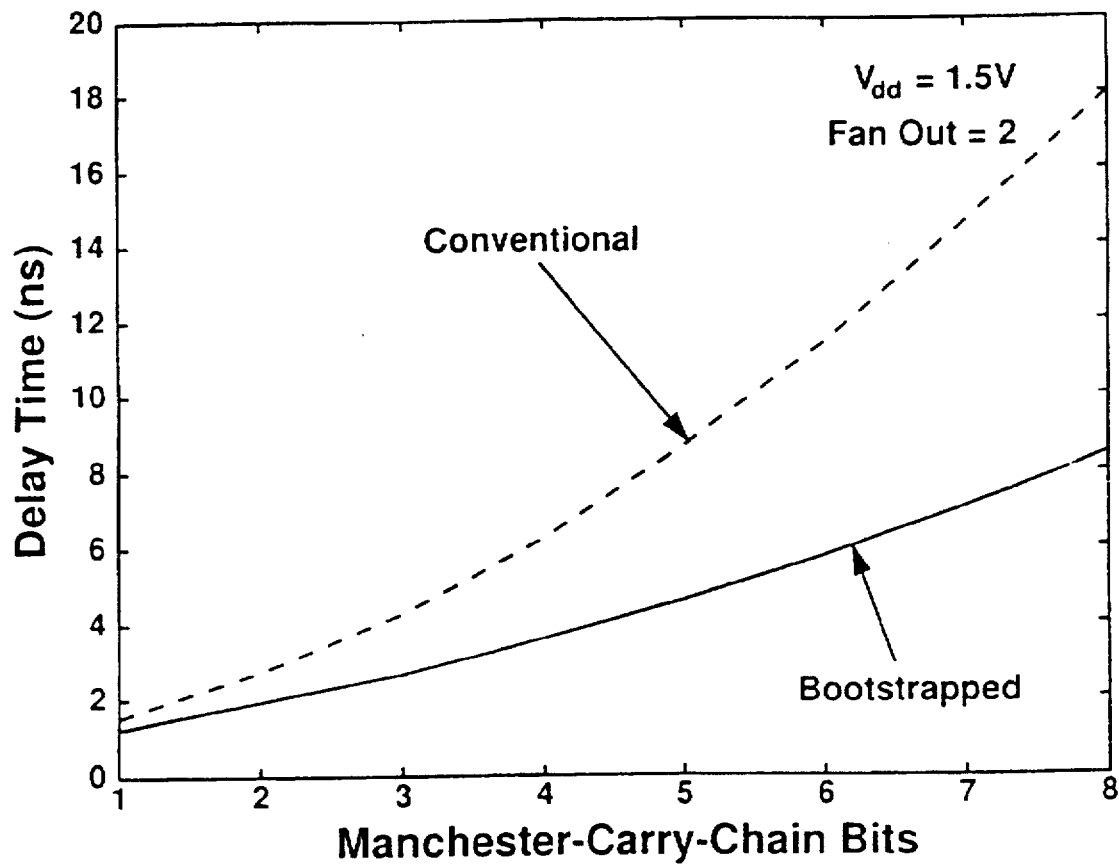
FIG. 4 shows a delay time (ns) versus bit number of the Manchester-carry-chain circuit using the 1.5 V bootstrapped pass-transistor-based circuit and without.

FIGS. 3a and 3b show the transients of the 4-bit Manchester-carry-chain circuit using the 1.5 V bootstrapped pass-transistor-based circuit and without, respectively. As shown in the FIGS. 3a and 3b, with the bootstrapper circuit, during the transient, the $P_0$ signal to gate of the pass transistor can surpass 1.5 V. As a result, the pass transistor can turn on earlier as compared to the one in the conventional Manchester-carry-chain circuit. Consequently, a higher speed can be expected for the Manchester-carry-chain circuit with the bootstrapper circuit. FIG. 4 shows the delay time versus bit number of the Manchester-carry-chain circuit using the 1.5 V bootstrapped pass-transistor-based circuit and without. As shown in FIG. 4, a consistent improvement in speed can be seen for the Manchester-carry-chain circuit with the bootstrapped pass-transistor-based circuit. At 8 bits, the speed enhancement is 2.1 times.

Figure 5:
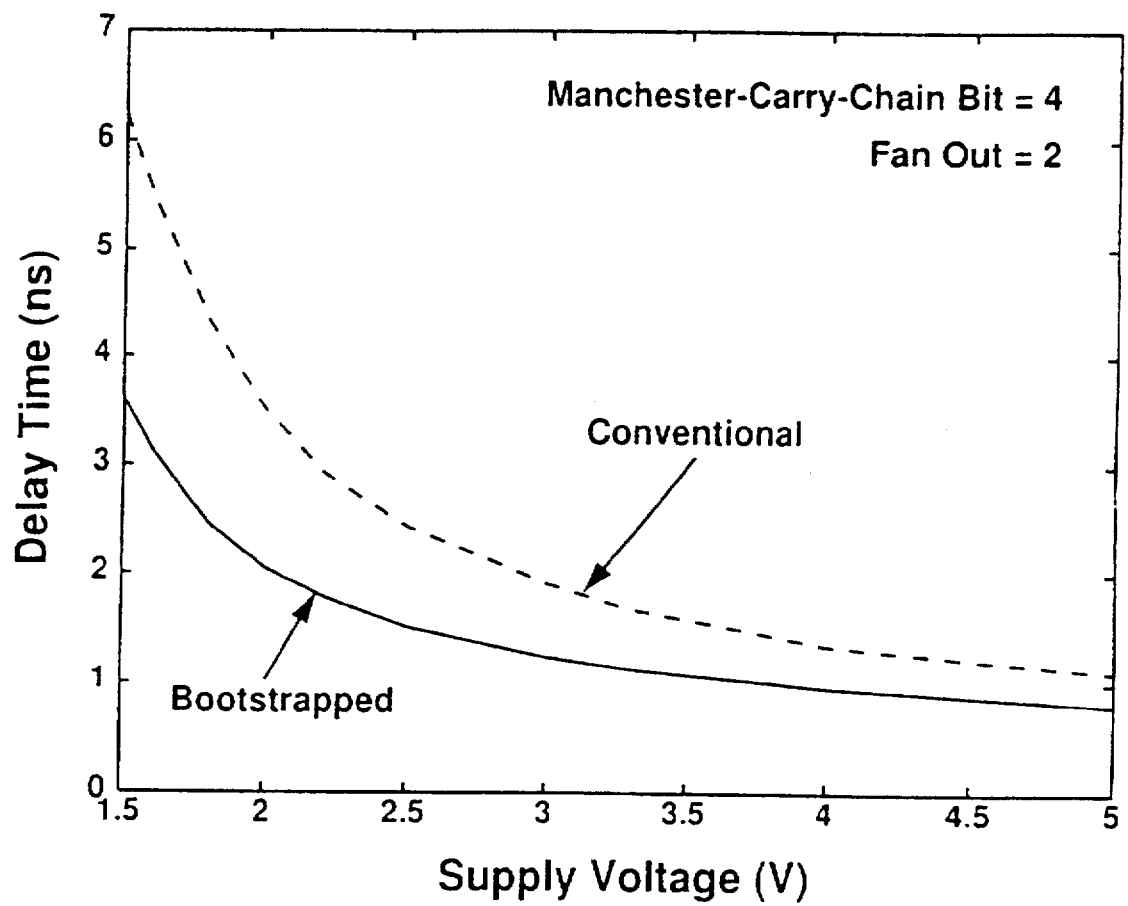
FIG. 5 shows delay time (ns) versus supply voltage (V) of the 4-bit Manchester-carry-chain circuit using the 1.5 V bootstrapped pass-transistor-based circuit and without.

It can be understood from the above description to the preferred embodiment with reference to the drawings that the bootstrapped pass-transistor-based Manchester-carry-chain circuit is especially advantageous for low supply voltage applications. FIG. 5 shows the delay time versus supply voltage of the 4-bit carry look-ahead circuit using the 1.5 V bootstrapped pass-transistor-based circuit and without. As shown in FIG. 5, at a supply voltage of 1.5 V, the improvement is 1.7 times.

It is apparent to people skilled in the art that the bootstrapper circuit 10 in FIG. 2b may be modified by replacing the PMOS transistor MPC with a capacitor, and the modified circuit can be contemplate as an equivalent in function.

What is claimed is:

1. A high-speed low voltage bootstrapped pass-transistor-based Manchester-carry-chain circuit suitable for low-voltage CMOS VLSI comprising a Manchester-carry-chain circuit and a bootstrapper circuit, said bootstrapper circuit comprising two P-type metal-oxide-semiconductor (PMOS) transistors MPB and MP, each of which having a drain terminal, a source terminal and a gate terminal one N-type metal-oxide-semiconductor (NMOS) transistor MN having a drain terminal, a source terminal and a gate terminal; a capacitor device having a bottom plate and a top plate; and an inverter having an input terminal and output terminal, wherein said source terminal of said NMOS transistor MN is earthed;

said input terminal of said inverter is provided with an input signal $\overline{P}_i$;

said drain terminal of said PMOS transistor MP and said source terminal of said PMOS transistor MPB are both connected to said bottom plate of said capacitor device;

said source terminal of said PMOS transistor MP is connected to a power $V_{dd}$;

said drain terminal of said PMOS transistor MPB is connected to said drain terminal of said NMOS transistor MN;

said gate terminals of said NMOS transistor MN and said PMOS transistor MPB are provided with said input signal $\overline{P}_i$;

said gate terminal of said PMOS transistor MP and said top plate of said capacitor device are connected to said output terminal of said inverter; and an intermediate node between said drains of said PMOS transistor MPB and said NMOS transistor MN is connected to a gate terminal of a NMOS transistor as a pass transistor in said Manchester-carry-chain circuit so that a carry propagation signal $P_i$ is provided from said intermediate node to said gate terminal of said pass transistor.

2. The Manchester-carry-chain circuit according to claim 1, wherein said capacitor device is a PMOS transistor MPC having a drain terminal, a source terminal and a gate terminal, the drain terminal and source terminal of said PMOS transistor MPC being connected with each other, wherein the connected drain terminal and source terminal of PMOS transistor MPC are connected to said drain terminal of said PMOS transistor MP and to said source terminal of said PMOS transistor MPB as said bottom plate, and said gate terminal of PMOS transistor MPC is connected to id output terminal of said inverter as said top plate of said capacitor device.

* * * * *